(12) United States Patent
Dunberger (10) Patent No.: US 12,455,086 B2
(45) Date of Patent: Oct. 28, 2025

(54) AIR PURIFIER

(71) Applicant: Blueair AB, Stockholm (SE)

(72) Inventor: Lars Henrik Dunberger, Stockholm (SE)

(73) Assignee: BLUEAIR AB, Stockholm (SE)

( * ) Notice: Subject to any disclaimer, the term of this patent is extended or adjusted under 35 U.S.C. 154(b) by 650 days.

(21) Appl. No.: 17/769,894

(22) PCT Filed: Oct. 19, 2020

(86) PCT No.: PCT/EP2020/079380
§ 371 (c)(1),
(2) Date: Apr. 18, 2022

(87) PCT Pub. No.: WO2021/078688
PCT Pub. Date: Apr. 29, 2021

(65) Prior Publication Data
US 2022/0275955 A1  Sep. 1, 2022

(30) Foreign Application Priority Data

Oct. 21, 2019 (EP) .................................... 19204294
Oct. 21, 2019 (EP) .................................... 19204299
Oct. 21, 2019 (EP) .................................... 19204301

(51) Int. Cl.
*F24F 8/30* (2021.01)
*B01D 46/00* (2022.01)
(Continued)

(52) U.S. Cl.
CPC ............ *F24F 8/30* (2021.01); *B01D 46/0049* (2013.01); *B03C 3/12* (2013.01); *B03C 3/155* (2013.01);
(Continued)

(58) Field of Classification Search
CPC ............ B01D 2273/30; B01D 46/0049; B01D 46/005; F24F 8/80; F24F 8/10;
(Continued)

(56) References Cited

U.S. PATENT DOCUMENTS

D83,092 S    1/1931  Chadwick et al.
4,152,973 A * 5/1979  Peterson ................. F24F 7/065
                                                454/231

(Continued)

FOREIGN PATENT DOCUMENTS

CA    2632450 A1    12/2009
CN    202823018 U * 3/2013
(Continued)

OTHER PUBLICATIONS

Search Report and Written Opinion in EP19204299; Apr. 6, 2020.
(Continued)

*Primary Examiner* — Jennifer Dieterle
*Assistant Examiner* — Sonji Turner
(74) *Attorney, Agent, or Firm* — Carter, DeLuca & Farrell, LLP; Bret P. Shapiro (57) ABSTRACT

An air purifier comprising at least one removable particulate filter, a fan or impeller and a motor for driving said fan or impeller, a top and, opposite thereto, a base and means for elevating said base from the ground, at least one side surface connecting said top and base, a base air intake disposed on said base and facing the ground in a working configuration a top air intake on said top and facing away from the ground in a working configuration and an air outlet located on said side surface.

10 Claims, 6 Drawing Sheets

US 12,455,086 B2

Page 2

(51) Int. Cl.
  *B03C 3/12* (2006.01)
  *B03C 3/155* (2006.01)
  *B03C 3/36* (2006.01)
  *F24F 8/10* (2021.01)

(52) U.S. Cl.
  CPC ............... *B03C 3/368* (2013.01); *F24F 8/10* (2021.01); *B01D 2273/30* (2013.01)

(58) Field of Classification Search
  CPC .......... F24F 13/20; F24F 13/108; F24F 13/30; F24F 13/80; F24F 13/192; F24F 2221/10; F24F 2221/12; F24F 1/02; A61L 9/22; A47B 2200/00; A47B 91/005; A47B 91/12; B03C 3/12; B03C 3/32; B03C 3/82; B03C 3/38; B03C 3/011; B03C 3/41; B03C 3/368
  See application file for complete search history.

(56) References Cited

U.S. PATENT DOCUMENTS

| | | | |
|---|---|---|---|
| 4,255,176 A * | 3/1981 | Macrow | F24F 13/26 96/57 |
| 4,370,155 A * | 1/1983 | Armbruster | F24F 7/065 55/482 |
| 4,526,592 A * | 7/1985 | Armbruster | F24F 8/10 55/385.2 |
| 4,737,173 A | 4/1988 | Kudirka et al. | |
| 4,738,188 A * | 4/1988 | Nishida | F24F 11/0001 454/235 |
| 4,900,344 A * | 2/1990 | Lansing | F24F 1/0071 55/482 |
| 5,290,330 A * | 3/1994 | Tepper | B01D 46/0049 55/385.2 |
| 5,348,563 A * | 9/1994 | Davis | F24F 8/108 96/135 |
| 5,984,990 A * | 11/1999 | McDonald | B25H 1/02 55/528 |
| 5,997,619 A * | 12/1999 | Knuth | B01D 46/0038 55/385.2 |
| D423,814 S | 5/2000 | Belka et al. | |
| 7,112,232 B2 * | 9/2006 | Chang | F24F 13/28 55/467 |
| 7,531,141 B2 * | 5/2009 | Descotes | F24F 1/0353 422/177 |
| D615,556 S | 5/2010 | Yeo et al. | |
| D629,827 S | 12/2010 | Morenstein et al. | |
| D639,413 S | 6/2011 | Wu | |
| D675,190 S | 1/2013 | Nylen | |
| D682,406 S | 5/2013 | Yeom | |
| D695,711 S | 12/2013 | Szymanski et al. | |
| D713,405 S | 9/2014 | Akana et al. | |
| D714,923 S | 10/2014 | Engelhard et al. | |
| D716,427 S | 10/2014 | Lim et al. | |
| D721,061 S | 1/2015 | Burlingame et al. | |
| D723,480 S | 3/2015 | Lee et al. | |
| D746,795 S | 1/2016 | Burlingame et al. | |
| D753,628 S | 4/2016 | McManigal | |
| D758,345 S | 6/2016 | Fujioka | |
| D783,794 S | 4/2017 | Shen | |
| D791,297 S | 7/2017 | Ljungstrom et al. | |
| 9,694,369 B2 * | 7/2017 | Engberg | B03C 3/86 |
| 9,919,252 B2 * | 3/2018 | Wennerström | F24F 8/108 |
| 9,950,289 B2 * | 4/2018 | Jung | B01D 46/0045 |
| D829,687 S | 10/2018 | Burlingame et al. | |
| D835,249 S | 12/2018 | Echeverri et al. | |
| D835,765 S | 12/2018 | Chen | |
| D848,399 S | 5/2019 | Burlingame et al. | |
| D852,344 S | 6/2019 | Hua | |
| D864,367 S | 10/2019 | Chen et al. | |
| 10,436,469 B2 * | 10/2019 | Mun | F04D 29/462 |
| D868,726 S | 12/2019 | Kim et al. | |
| D869,626 S | 12/2019 | Reisenberger et al. | |
| 10,518,205 B2 * | 12/2019 | Mun | F24F 8/80 |
| D882,055 S | 4/2020 | Ediger et al. | |
| D886,765 S | 6/2020 | Wilberding et al. | |
| D897,315 S | 9/2020 | Hong | |
| D906,279 S | 12/2020 | Nam et al. | |
| D912,796 S | 3/2021 | Huang et al. | |
| D915,575 S | 4/2021 | Chen | |
| D920,278 S | 5/2021 | Wilberding et al. | |
| D921,869 S | 6/2021 | Han | |
| D924,385 S | 7/2021 | Liu et al. | |
| D925,024 S | 7/2021 | Huang | |
| D931,253 S | 9/2021 | Wilberding et al. | |
| D931,731 S | 9/2021 | Mayer | |
| D933,179 S | 10/2021 | Fu | |
| 11,938,433 B2 * | 3/2024 | Mun | F24F 8/80 |
| 2005/0160907 A1 | 7/2005 | Zhang | |
| 2006/0278086 A1 * | 12/2006 | Inagaki | B01D 46/0028 96/223 |
| 2008/0000205 A1 | 1/2008 | Bohlen | |
| 2009/0038480 A1 | 2/2009 | Garman et al. | |
| 2011/0100221 A1 * | 5/2011 | Wu | B01D 46/12 96/64 |
| 2011/0274600 A1 | 11/2011 | Steffens | |
| 2014/0238243 A1 * | 8/2014 | Jardine | B01D 46/0047 55/467 |
| 2014/0331622 A1 * | 11/2014 | Gruenbacher | B01D 46/42 55/467 |
| 2015/0231543 A1 | 8/2015 | Wennerstrom et al. | |
| 2017/0246572 A1 * | 8/2017 | Park | F24F 8/80 |
| 2017/0246578 A1 * | 8/2017 | Jung | B01D 46/24 |
| 2017/0246580 A1 * | 8/2017 | Bae | F24F 8/108 |
| 2017/0246582 A1 * | 8/2017 | Park | F24F 8/80 |
| 2017/0248153 A1 * | 8/2017 | Park | F04D 29/703 |
| 2018/0154296 A1 | 6/2018 | Swan et al. | |
| 2018/0169666 A1 | 6/2018 | Loreth | |
| 2019/0264948 A1 * | 8/2019 | Jung | A61L 2/22 |
| 2019/0308122 A1 * | 10/2019 | Aries | F24F 13/06 |
| 2020/0061231 A1 * | 2/2020 | Jeong | B01D 46/64 |
| 2020/0116367 A1 * | 4/2020 | Zhang | F24F 7/003 |
| 2020/0147257 A1 | 5/2020 | Chiu | |
| 2020/0284449 A1 * | 9/2020 | Kim | B60H 1/00428 |
| 2020/0298167 A1 * | 9/2020 | Jeon | B01D 46/4245 |
| 2020/0306766 A1 * | 10/2020 | He | B03C 3/82 |
| 2021/0190342 A1 | 6/2021 | Zhan | |
| 2022/0088519 A1 * | 3/2022 | Booth-Dawson | F24F 13/072 |
| 2022/0275955 A1 | 9/2022 | Dunberger | |
| 2023/0003403 A1 * | 1/2023 | Kim | B01D 46/2403 |

FOREIGN PATENT DOCUMENTS

| | | | | |
|---|---|---|---|---|
| CN | 104014204 | | 9/2014 | |
| CN | 104014204 A | * | 9/2014 | |
| CN | 203916301 U | * | 11/2014 | |
| CN | 104848425 A | | 8/2015 | |
| CN | 106051938 | | 10/2016 | |
| CN | 106051938 A | * | 10/2016 | |
| CN | 107504589 | | 12/2017 | |
| CN | 107635667 A | | 1/2018 | |
| CN | 206919316 | | 1/2018 | |
| CN | 107754604 A | | 3/2018 | |
| CN | 107842936 A | * | 3/2018 | ............. F24F 13/24 |
| CN | 207907384 U | * | 9/2018 | ............. F24F 13/24 |
| CN | 108626809 | | 10/2018 | |
| CN | 108626809 A | * | 10/2018 | |
| CN | 108652203 | | 10/2018 | |
| CN | 108652203 A | * | 10/2018 | |
| CN | 304934965 | | 12/2018 | |
| CN | 304987501 | | 1/2019 | |
| CN | 109520044 A | * | 3/2019 | ............. F24F 13/24 |
| CN | 305448344 | | 11/2019 | |
| CN | 213020145 U | | 4/2021 | |
| EP | 0646416 | | 4/1995 | |
| EP | 1433514 | | 6/2004 | |
| EP | 2093506 A1 | * | 8/2009 | ............. A61L 9/16 |
| EP | 1433515 | | 12/2009 | |
| JP | D1690687 | | 7/2021 | |
| KR | 20180008063 A | | 1/2018 | |
| KR | 3011402740001 | | 12/2021 | |

(56) References Cited

FOREIGN PATENT DOCUMENTS

| WO | WO9519225 | 7/1995 |
|---|---|---|
| WO | WO2005039659 | 5/2005 |
| WO | WO2008045895 | 4/2008 |

OTHER PUBLICATIONS

Search Report and Written Opinoin in EP19204301; Apr. 8, 2020.
Search Report and Written Opinion in EP19204294; Apr. 28, 2020.
Search Report and Written Opinion in PCTEP2020079378; Jan. 14, 2021.
Search Report and Written Opinion in PCTEP2020079380; Jan. 21, 2021.
Search Report and Written Opinion in PCTEP2020079379; Jan. 14, 2021.
Written Opinion in PCTEP2020079380; Aug. 26, 2021.
Blueair DustMagnet Air Purifier, posted Jan. 29, 2021 [online], [retrieved Jan. 12, 2022), Retrieved trom internet, https://www.youtube.com/watch?v=XX2H3Tsnwgg (on or around timestamp 0:40 into the video); Jan. 29, 2021.
RedyPure Air Purifiers, first available Sep. 2, 2020[online], [site visited Jan. 6, 2022], Available from internet, https://www.amazon.com/dp/B08CKBQNBB; Sep. 2, 2020.
Rovacs Air Purifiers, first available Oct. 22, 2020[online], [site visited Dec. 13, 2021), Available from internet, https://www.amazon.com/ROVACS-Purifiers-Allergies-Available-California/dp/B08LN85H7Z; Oct. 22, 2020.

\* cited by examiner

AIR PURIFIER

The present invention relates to an improved air purifier.

CN104014204A (Huang Yuemei) discloses an air purifier comprising a main body shell, and a top enclosure and a bottom enclosure which are connected with the top and the bottom of the main body shell respectively, and further comprises a central flow distribution plate, a side air deflector, a second filter net, a gas-state filter net, a draught fan box, a honeycomb rectifying plate and a first filter net which are sequentially connected in the main body shell from top to bottom, wherein a whole airtight structure is composed of the second filter net, the gas-state filter net, the draught fan box, the honeycomb rectifying plate and the first filter net; the central flow distribution plate is fixedly connected with the inner wall of the top enclosure; an air outlet channel with a V-shaped section is composed of the central flow distribution plate and the side air deflector connected with the inner side wall of the main body shell, so that a vertical air flow is distributed into parallel air flows and then is discharged in a flow splitting manner.

CN106051938A (University Shenyang Jianzhu) discloses an air purification system which comprises a case, a filter assembly and a draught fan are installed in the case. A detachable front panel is arranged on the front end face of the case. Side air inlets are formed in the two sides of the case. A near-ground air inlet is formed in the bottom of the case. An air outlet is formed in the top of the case. The filter assembly sequentially comprises a coarse filter plate, a micro filter plate, an active filter plate and a cold catalyst filter plate from outside to inside. Polygonal through holes are formed in a plate body of the cold catalyst filter plate. The front end face and the rear end face of the cold catalyst filter plate and the hole walls of the through holes are coated with cold catalyst coatings. The active filter plate comprises a plate body provided with through honeycomb holes, the honeycomb holes in the plate body are filled with active adsorption substances composed of active carbon and high-adsorption-capacity active carbon adsorption substances, and anti-disengagement nets are arranged on the front end face and the rear end face of the plate correspondingly.

CN108626809A (Suzhou Lyutian Electronic Tech Co Ltd) discloses a vertical air purifier comprising a base, an upper shell and a lower shell. The invention designs the vertical air purifier. The lower shell is detachably connected above the base of the air purifier through a supporting rack, the upper shell and the lower shell are detachably connected through the supporting column, the base is horn-shaped, a storage battery is arranged at the position, below the supporting rack, of the base, a control panel and a charging socket are formed in the circumference of the storage battery, the structure in the lower shell and the upper shell are symmetrically arranged, an air inlet and an air outlet are formed of grid structures, the upper shell and the lower shell are of cylindrical structures, and the air outlet of the upper shell and the air outlet of the lower shell are formed oppositely to accelerate air convection.

U.S. Pat. No. 4,526,592A (Armbruster) discloses an air circulator and air filtration device for a room or other enclosed space supported in the corner thereof intermediate the floor and ceiling and including an upwardly opening top air inlet and a downwardly opening bottom air inlet with each inlet including a filter assembly and a pair of discharge outlets for discharging air horizontally in a path generally parallel to and adjacent the walls which intersect to form the corner in which the air circulator is mounted. The air circulator includes a single motor and an upper and lower blower assembly driven by the motor with the upper blower assembly communicating only with the upper air inlet and discharging toward one of the air outlets and the lower blower assembly communicating only with the bottom inlet and discharging toward the other of the outlets for maintaining a substantially constant and equal volume of air discharged along each of the intersecting walls of the room for effective circulation of air throughout the room and substantially eliminating temperature stratification in the room. Each air inlet filter assembly includes a foam pre-filter and an activated carbon filter for cleaning and purifying air being circulated.

US20090038480A (Hamilton Beach Brands) discloses an air purifier that removes particles or contaminants from air includes a base having an air inlet, an air outlet and an air flow path therethrough. An impeller urges air into the air inlet, through the air flow path and out of the air outlet and a motor drives the impeller. The motor and impeller are supported within the base. A foldable air filter is in fluid communication with the air outlet and is removably mountable to an exterior surface of the base proximate the air outlet.

US20140331622A (Procter and Gamble) discloses a device for filtering air comprising a base, a fan functionally attached to the base, an air filter releasably attached to the base, and a substantially air impermeable outer sleeve is provided.

Despite the prior art there remains a need for improved air purifiers in particular for air purifiers which improve the circulation of ambient air without merely increasing the fan speed and therefore increasing the energy consumption.

Domestic dust is a universal problem and presents a different challenge to other forms of particulate pollution. Domestic dust is predominantly composed of human skin and hair and is sufficiently heavy to settle when there is no or little air flow. Accordingly, domestic dust is one of the few pollutants that are sufficiently large to be visible, particularly when settled on a surface. When settled dust is disturbed it aggregates and makes a more visible problem.

Accordingly, an air purifier which is designed specifically to target dust agglomeration is particularly attractive for the consumer.

Accordingly, and in a first aspect there is provided an air purifier comprising at least one removable particulate filter, a fan or impeller and a motor for driving said fan or impeller, a top and, opposite thereto, a base and means for elevating said base from the ground, at least one side surface connecting said top and base, a base air intake disposed on said base and facing the ground in a working configuration a top air intake on said top and facing away from the ground in a working configuration and an air outlet located on said side surface.

We have surprisingly found that combining an air intake on the base and also on the top of an air purifier together with an outlet on the side, assists in air circulation in a manner which is beneficial to the overall air purifying performance of the purifier. In particular it permits improves air circulation around the purifier which has the added benefit of permitting more circulation without merely increasing fan speed, and so energy consumption.

It is thought that locating the air intake at the base and in a manner such that the intake faces the ground when in a working configuration causes a build-up of pressure between the base and the ground as the air is drawn into the device by the fan or impeller. This creates a degree of turbulence between the base and the ground on which the purifier is located and thereby increases the aggregation of domestic dust particles. This means that the removal of domestic dust is more effective and also that the fan or impeller speed can be reduced to use less energy for the same purification performance.

Preferably, the base is defined by a perimeter which is interrupted only by any legs or stand present to maintain the device off the ground in a working configuration. In such an embodiment, the device may draw air from all around the base and not be limited to any one particular direction. Being able to drawn air circumferentially is important in achieving the desired air flow circulation characteristics. Preferably the air intake on the bottom is substantially circular so as to facilitate equal drawing of air from all directions. Similarly, it is preferred that the air intake on the top surface is substantially circular for the same reasons.

Preferably, the air outlet is substantially square or rectangular to provide a directed stream of air coming from the device. More preferably, the side wall on which the air outlet is disposed is substantially planar again to facilitate uniform air flow and to reduce dispersed flow of air coming from the device. Preferably, the air outlet on the side wall is square or rectangular in shape and extends either side of an imaginary line between the top and bottom surfaces. This means that the air is expelled from the device substantially from the centre of the device and not from the top or the base. Similar devices having a side air outlet towards the top or bottom will not function in the same way because the air whorl created will not be substantially uniform and so the air agitation will not be optimised.

Preferably, the air outlet extends above and below the imaginary line half way between the top and bottom and on the side surface by up to 30% of the average distance between the top and bottom, more preferably up to 50%, especially up to 60% and most preferably up to 76% the length of the side surface between the top and the bottom.

Similarly, it is preferred that the air outlet extends either side of an imaginary line half way between the front and back on the side surface by up to 30% of the average distance between the front and back, more preferably up to 50%, especially up to 60% and most preferably up to 76% the average distance on the side surface between the front and the back.

In a most preferred embodiment the device comprises an air intake on the top and also on the bottom of the device and a pair of opposing air outlets on the side. The air intakes are substantially circular and planar and the air outlets are substantially planar and substantially rectangular or square in shape.

The circulation of air that is created by such a design facilitates aggregation of domestic dust particles and which makes it easier to entrain said aggregated particles, especially on a lower fan speed setting and also with a less dense particulate filter medium.

Air to be purified passes from ambient into the purifier by way of at least one air inlet. Preferably, the at least one air inlet is partially occupied by a pre-filter.

Pre-filters are filters which have a low air resistance and also function as a poke guard, preventing the user from touching the volute or impeller assembly. The pre-filters are not intended to exhibit any major effect in the context of air purification. They do not have the air resistance or particle entrainment capability of dedicated particulate filters. Preferably the pre filter is not a HEPA filter. Where a pre filter is disposed at or in the vicinity of an air outlet it is referred to as a poke guard but in essence is the same as a pre-filter.

Preferably, the means for elevating said base comprises a leg or a stand and there may be as many means as is required to support the base off the ground in a working configuration. Preferably, the means for elevating the base supports the base off the ground by at least 20% the average width (or circumference where it is circular) of the inlet when viewed from the front of the device. More preferably, the legs are spaced apart from the air intake around a perimeter of the base and around the intake. If the purifier is maintained too high off the ground during use there is no consequential turbulence effect. Further, if the device is maintained too close to the ground the pressure required to draw air into the device is too great and the friction between the air flow and the ground removes any advantages gained through this design.

In a preferred embodiment the top of the device also comprises an additional air intake. This further improves the circulation of air around the room in which the purifier is present. In such an embodiment the ambient air is drawn in from the top and the bottom of the air purifier, cleaned, and then ejected out of the side. This generates a particular air circulation pattern which greatly increases the circulation of air in a manner which uses less energy and generates less fan/impeller noise. In effect there is created a synergy between the top air flow and the bottom air flow as each draw air in from opposite sides of the device and yet eject them in the same direction. This creates a whorl which greatly aids air circulation in the room in which the device is kept. However, the real advantage is that this means that the domestic dust is more easily filtered out of the ambient air as it is aggregated in the air flow around the device and so more easily drawn into the device.

This circulation is unusual in the context of air purifiers in that it is usual to avoid such circulation patterns in order to purify a greater volume of air. Usually air purifiers, as exemplified in the introduction, are designed to drawn air in from the sides or bottom and out through a top in order to facilitate access to a greater volume of ambient air. The device described herein eschews this design in order to provide improved filtration of aggregated domestic dust particles.

Preferably, said air outlet is located on said side surface. Preferably, the outlet is disposed in a plane which is substantially orthogonal to a plane of the intake on the base, and also where present, the plane of the air intake on the top surface. This contributes greatly to circulating the air more effectively around the room in which the purifier is present.

Preferably, said top and base are rectangular or square in form, and comprises four side surfaces connecting said top and base, and wherein the air outlet is disposed on at least one side surface. Where the outlet is disposed on more than one side surface it is preferred that they are disposed on opposite side surfaces. Most preferably the device comprises two opposing side surfaces when viewed from the front and both side surfaces comprise an air outlet. Accordingly, when viewed from the front air is drawn in from the base (and preferably the top also) and out through the opposing sides. In such an embodiment air flow circulation is improved when compared to other designs. This is because the flow of air is vectored in a manner which is not seen in cylindrically shaped purifiers. In particular, it provides for improved vertical component of the air circulation whorl created as the air outlets are restricted to the opposing sides, and given their opposing facing disposition, they eject the air in a more channelled fashion such that it extends further from the purifier. In contrast, a cylindrical structure would eject air in a more circumferentially spread manner, thus reducing the size and impact of any whorl created. This is especially important for agitating dust around the purifier. It also provides improved air purifying efficiency in that the surface area for filtration is greater. This benefit is particularly seen when combining a circumferential draw of air into the device with a vectored ejection of air. The whorl created provides for efficient air purification, particular of dust, without blowing air strongly on the user.

Further, this form of the device permits the user to choose air flow more easily within the domestic setting. The user often does not appreciate feeling air flowing around them. This is not possible in a cylinder type device where the air outlet spreads air weakly in all directions.

Where the air purifier comprises a pair of air intakes it is preferred that the purifier also contains an air flow chamber for each intake. Each air flow intake will also preferably comprise its own removable particulate filter, preferably a HEPA filter. In such a design, it is possible for the purifier to also comprise a fan or impeller for each chamber, but it is also possible that the purifier only contains one fan and that this is after the removable particulate filters in an air flow direction.

In such an embodiment the air purifier will comprise a pair of air flow ducts, each air flow duct comprising an air intake, a fan or impeller, a removable particulate filter, and an air outlet. Preferably, the fan or impeller for each air duct is powered by a single motor.

The purifier of the invention also comprises a fan or impeller to urge ambient air through the device. The fan may be an axial fan, but it is preferred that the fan is a radial fan.

Where the purifier comprises a pair of air flow chambers it is preferred that 'the fan' comprises a pair of oppositely directed fans, more preferably radial fans such that they are powered as one unit but function to draw air from opposite directions and out in opposite directions. This is a more efficient fan architecture when more than one air flow chamber is required.

Where the device comprises a pair of air outlets on opposing side surfaces it is preferred that the fans, or impellers, are disposed such that their axis of rotation substantially points towards the respective air outlet such that the air passes from the fan and towards the outlet without any change in direction.

Preferably, the air purifier comprises an ioniser. Preferably, the ioniser comprises a corona discharge tip and a receiving electrode. When the corona discharge tip is subjected to an appropriate electric voltage it generates an ion field between the tip and the receiving or ground electrode.

The ioniser may be disposed on the interior or the exterior of said purifier. Where the ioniser is disposed on the exterior of said device it is preferred that it is disposed at the top of the device. Locating the external ioniser at the top of the device means that domestic dust particles are ionised as they fall through the air towards the ground and are therefore more likely to aggregate as they become charged. As they become more aggregated, they are more easily caught up in the air circulation pattern created by the device and so more easily filtered.

Where the ioniser is disposed in the interior of the device it is preferred that it is located before the removable particulate filter in an air flow direction.

Preferably, the device comprises an interior ioniser and an exterior ioniser. The exterior ioniser facilitating aggregation of domestic dust particles and the interior ioniser facilitating capture of the aggregated dust particles by the removable particulate filter. In both instances the ionisation permits less dense filtration media and low air speed (fan) speeds.

Preferably, the air purifier comprises a plate elevated above said top. Such a plate may perform as a table top to allow the device to form part of the furniture in a domestic setting. Preferably, the plate is elevated above the top surface of the purifier and is maintained by at least one rod above the top surface such that air may pass out of the air intake, where present, and between the top surface and the plate, and into the ambient space around said rod(s).

Preferably, the removable particulate filter is a High Efficiency Particulate Air (HEPA) filter. It is to be understood that while the filter part of an air purifier is a vital part of its function, air purifiers are not commonly manufactured with a filter in place. They are practically always manufactured separately and most importantly often by a different commercial enterprise than of the manufacturer of the air purifier itself. It is also typical for a manufacturer of filters to manufacture filters for different air purifier models made by different manufacturers. The particulate filter is to be contrasted with the pre-filter or any dust filter which is present. Pre-filters and dust filters are not considered HEPA filters as they do not have the particulate capturing capability exhibited by HEPA filters.

Embodiments of the invention will now be described with reference to the following non-limiting drawings in which:

Figure 1:
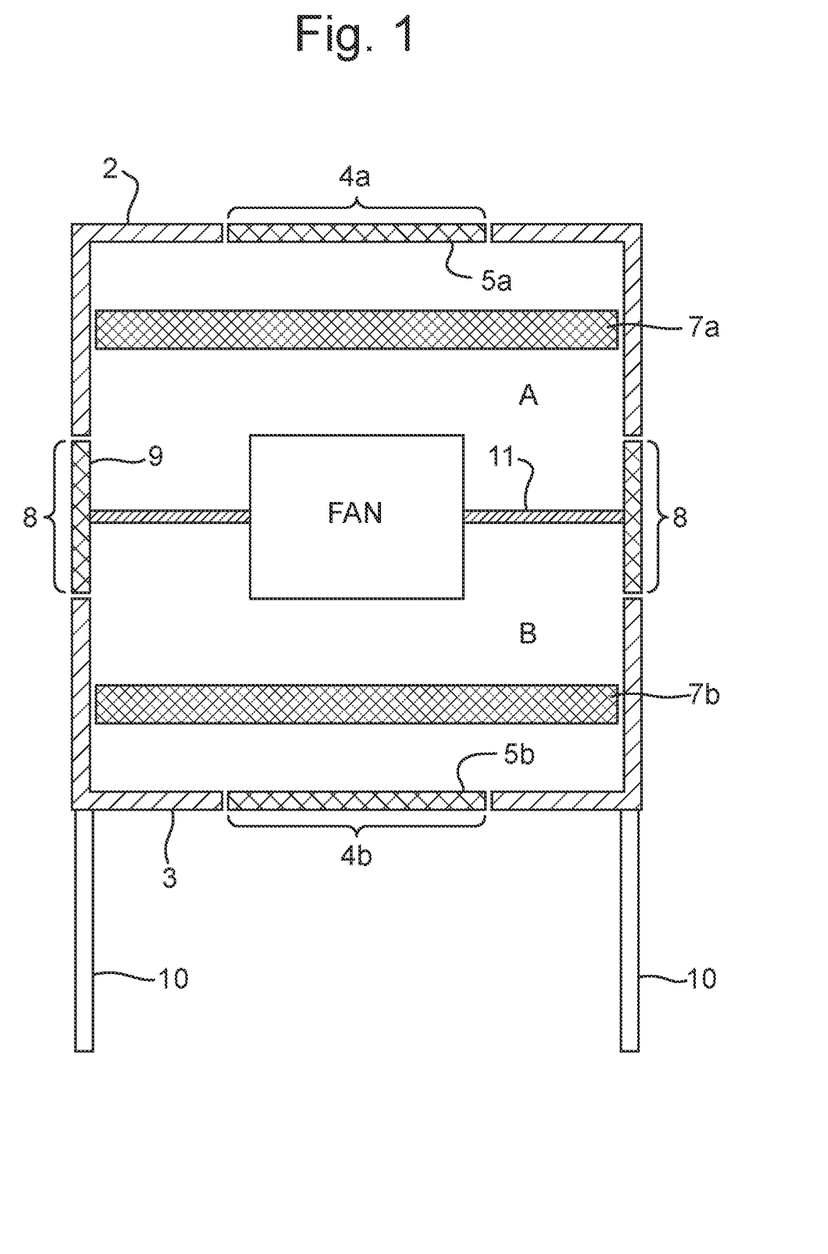

FIG. 1 shows a mid-cross section through an air purifier with a side wall (1), a top (2) and a bottom (3) surface. The top (2) and bottom surface (3) have an aperture (4a and 4b) which function as an air intakes when the fan (labelled) draws air from ambient into the device. The aperture air intakes (4a and 4b) are guarded by a poke filter (5a and 5b).

The device also comprises a pair of replaceable particulate HEPA filters (7a and 7b) through which the air must pass as it is moved by the fan towards the exit apertures (8). These outlets (8) are filled with a further poke guard (9) to prevent the user from easily accessing the interior of the device and causing damage to the device or themselves.

The interior of the purifier is formed into two distinct air flow chambers (A and B) where air is drawn into the device through air intake (4a) and HEPA filter 7a into chamber A and through air intake (4b) and HEPA filter (7b) into chamber B. The bulkhead (11) separates chambers A and B and also maintains the fan in a central disposition.

The device is maintained off the ground in use by legs (10).

Figure 2:
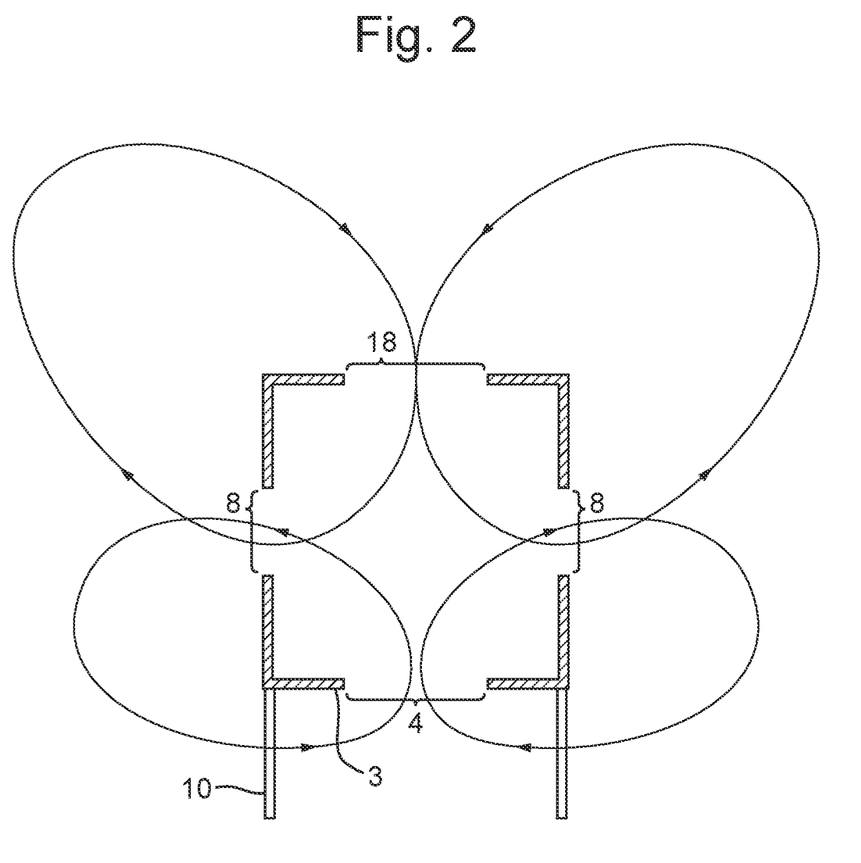

FIG. 2 is a schematic and shows how the air is circulated by an embodiment of the invention. The device is maintained off the ground by legs (10). Air is drawn in through the aperture on the base by the fan (not shown) and into the device. It exits through the outlets on the side (8). In this embodiment air is also drawn in through the aperture (18) on the top of the device thus creating an especially contrived air flow between air drawn in through the base (4) and air drawn in through the top.

Figure 3:
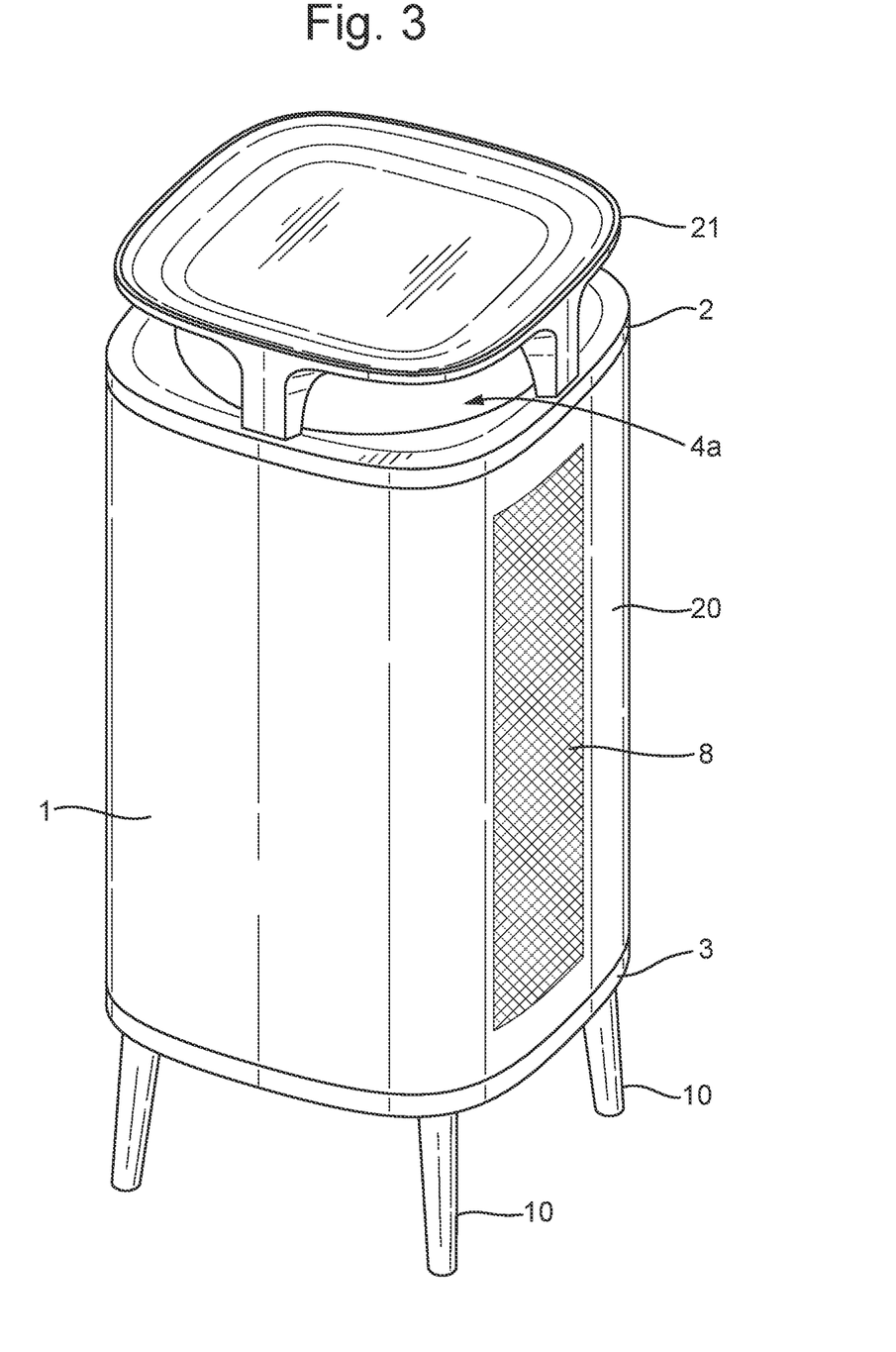

FIG. 3 is a perspective view of a device according to the invention. Shown is a purifier on legs (10) to maintain the device away from the ground and permitting air to be drawn from underneath the device during use.

On the top is an air intake (4a) through which air is drawn by a fan. There is also an intake on the base (3) not shown and which draws air from underneath the device. Side wall (1) has no air outlet whereas side wall (20) does have an air intake (8) and which is protected by a poke guard.

The device also has a table top (21) which can be used by the consumer to stand domestic decorative or functional items. The stand also agitates the air being drawn into the device thus improving the aggregation of dust particles in the ambient air.

Figure 4:
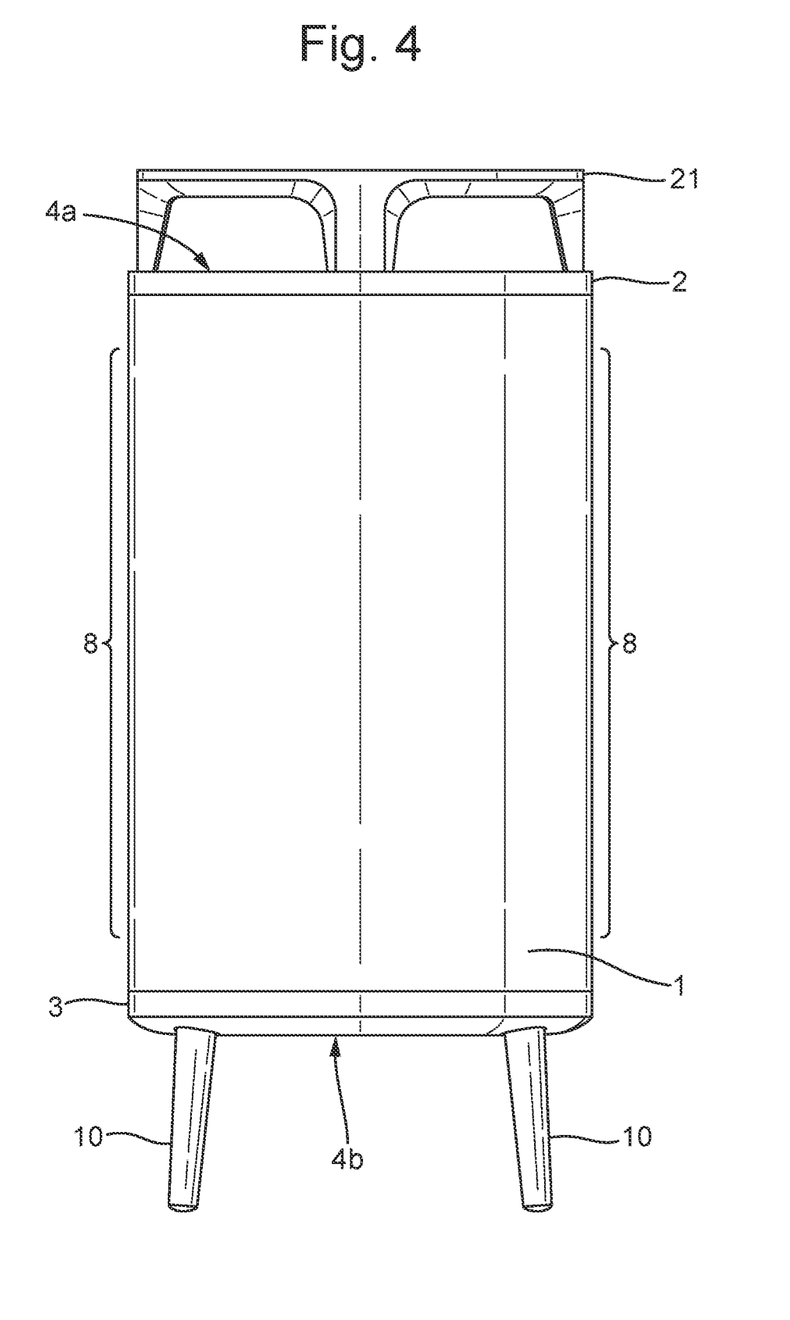

In FIG. 4 we see the same device but from the front view. Accordingly, the air outlets on side walls (20) are not in view. The base (3) is maintained above the ground by an amount commensurate with optimal agitation of the air stream and thus optimal agitation of dust particles in the ambient air.

Figure 5:
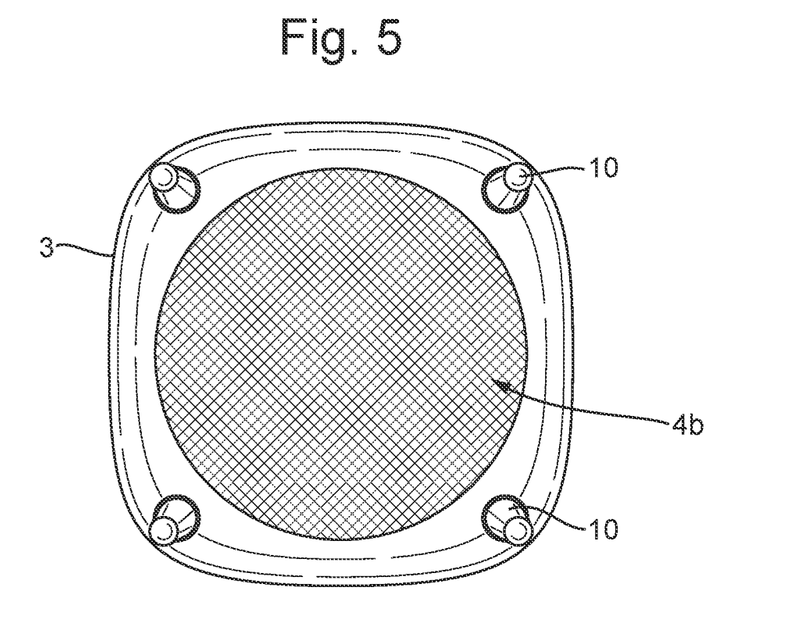

FIG. 5 is a bottom view of the device and which shows the legs (10) and a circular air intake (4b) protected by a pre-filter or poke guard.

Figure 6:
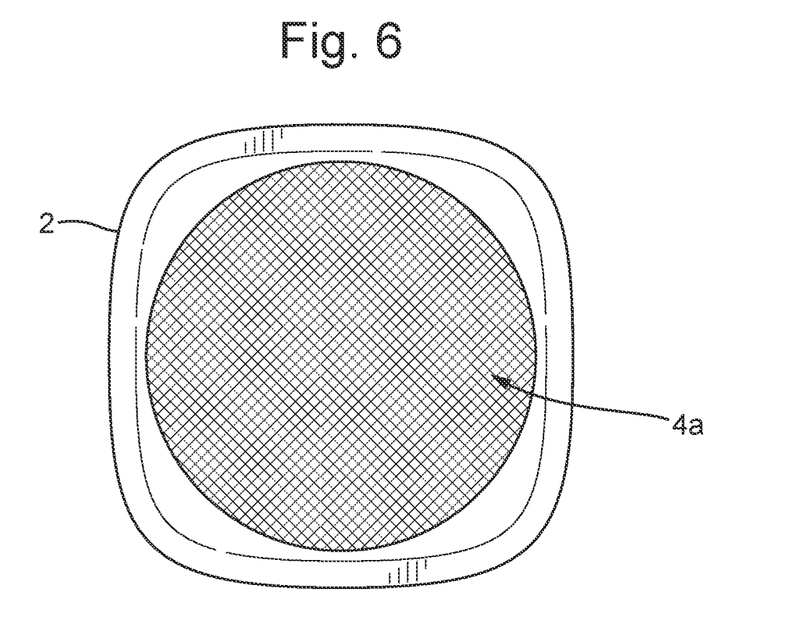

FIG. 6 is a plan view of the same device without the table top item (21) to show the configuration of the air intake on the top (2). The air intake is circular in design to facilitate drawing of air from all directions equally.

Figure 7:
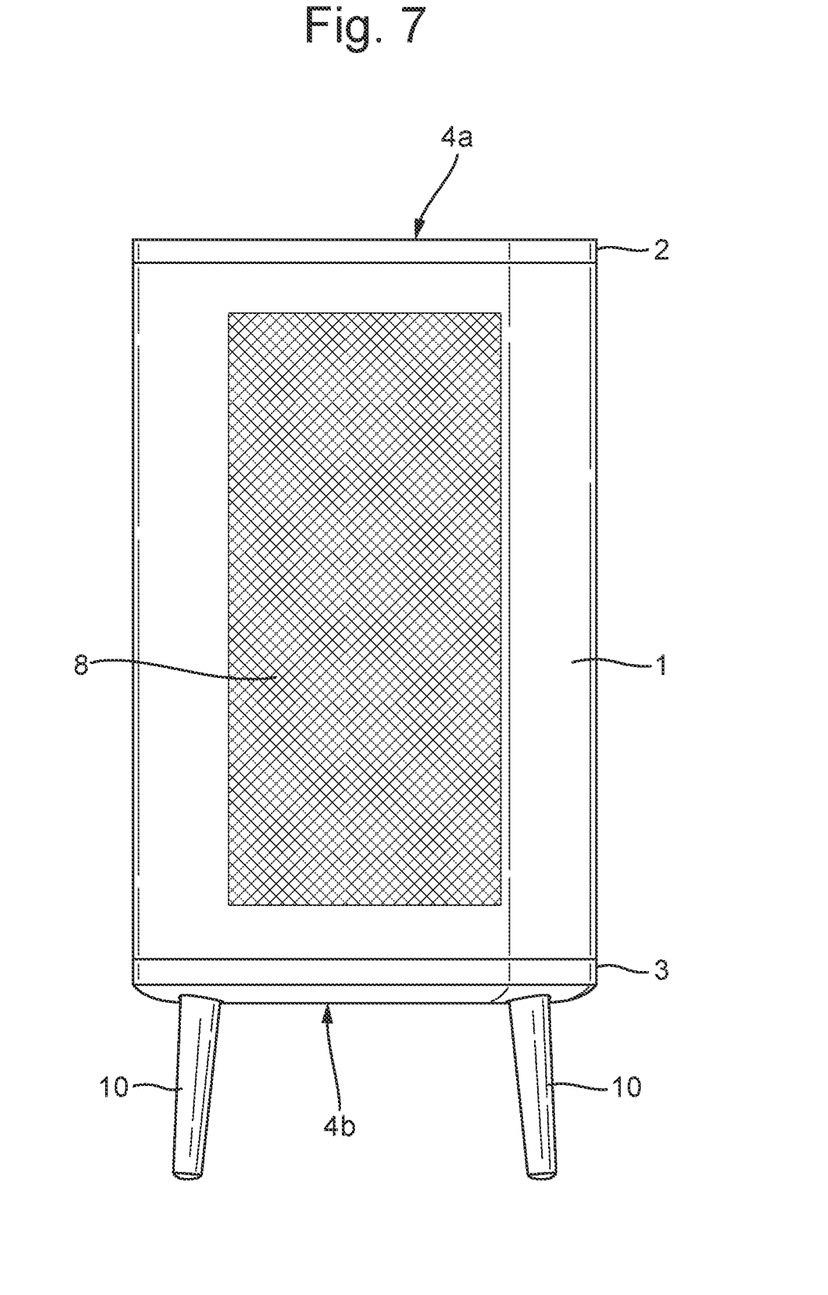

FIG. 7 is a schematic view from the side of a similar embodiment in which can be seen the air outlet (8) and which is rectangular and protected by a poke guard. The air outlet is of a substantially similar shape to the device in side profile.

The invention claimed is:

1. An air purifier comprising at least one removable particulate filter, a fan or an impeller and a motor for driving said fan or impeller, a top and, opposite thereto, a base and means for elevating said base from the ground, at least one side surface connecting said top and base, a base air intake disposed on said base and facing the ground in a working configuration, a top air intake on said top and facing away from the ground in a working configuration, and a pair of opposing air outlets, and wherein said top and base are rectangular or square in form and comprises four side surfaces connecting said top and base, and wherein the air outlets are disposed on two opposing side surfaces.

2. The air purifier according to claim 1 wherein the means for elevating said base comprises a leg or stand.

3. The air purifier according to claim 1 further comprising an ioniser.

4. The air purifier according to claim 3 wherein the ioniser is disposed on an exterior surface of said air purifier to ionise air outside the air purifier.

5. The air purifier according to claim 1 further comprising a supporting plate elevated above said top.

6. The air purifier according to claim 1 wherein the at least one removable particulate filter is a HEPA filter.

7. The air purifier according to claim 1 wherein the air purifier further comprises a pair of air flow ducts, and each air flow duct includes an air intake, one fan or one impeller, one removable particulate filter, and an air outlet.

8. The air purifier according to claim 7 wherein the fan or the impeller for each air duct is powered by a single motor.

9. The air purifier according to claim 4 wherein the ioniser on the exterior surface of the air purifier facilitates aggregation of domestic dust particles, the air purifier further comprising an interior ioniser to facilitate capture of the aggregated domestic dust particles by the at least one removable particulate filter.

10. The air purifier according to claim 1 wherein the air purifier has a bottom surface and a top surface and each of the top surface and bottom surface have an aperture to intake air when the fan draws air into the air purifier.

* * * * *